US012064787B2

(12) United States Patent
Perez et al.

(10) Patent No.: US 12,064,787 B2
(45) Date of Patent: Aug. 20, 2024

(54) METHOD OF CONDUCTING A COILED TUBING OPERATION

(71) Applicant: FORUM US, INC., Houston, TX (US)

(72) Inventors: Jessica Lorae Olson Perez, Houston, TX (US); Neal A. Lux, Kingwood, TX (US); Alex Paul Sheehan, Houston, TX (US); Irma Irais Galvan, Humble, TX (US); Garry F. Mcclelland, Arvada, CO (US); Raymond Rowland, Dayton, TX (US); Stephen Michael Hejducek, Houston, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 16/282,971

(22) Filed: Feb. 22, 2019

(65) Prior Publication Data

US 2020/0269276 A1 Aug. 27, 2020

(51) Int. Cl.

*B05D 3/12* (2006.01)
*E21B 19/16* (2006.01)
*E21B 19/22* (2006.01)
*E21B 41/00* (2006.01)
*B05D 1/02* (2006.01)

(52) U.S. Cl.

CPC ................ *B05D 3/12* (2013.01); *E21B 19/16* (2013.01); *E21B 19/22* (2013.01); *E21B 41/00* (2013.01); *B05D 1/02* (2013.01)

(58) Field of Classification Search

CPC .................................... B05D 3/12; B05D 1/02
See application file for complete search history.

(56) References Cited

U.S. PATENT DOCUMENTS

| | | | |
|---|---|---|---|
| 2,460,657 | A | 2/1949 | Robinson |
| 2,982,312 | A | 5/1961 | Caplan et al. |
| 3,278,330 | A | 10/1966 | Vau et al. |
| 4,863,091 | A | 9/1989 | Dubois |
| 5,515,707 | A | 5/1996 | Smith |

(Continued)

FOREIGN PATENT DOCUMENTS

| | | | |
|---|---|---|---|
| WO | 2013082134 | A1 | 6/2013 |
| WO | 2017106956 | A1 | 6/2017 |

OTHER PUBLICATIONS

Elliot, K. J. et al., "Laboratory Evaluation of a Novel Metal Surface Treatment for Coiled Tubing Friction Reduction in Extended-Reach Wells", SPE-189927-MS, Society of Petroleum Engineers, Mar. 2018, pp. 1-11.

(Continued)

*Primary Examiner* — Nathan T Leong
(74) *Attorney, Agent, or Firm* — Ewing & Jones, PLLC

(57) ABSTRACT

The disclosure relates to a method of conducting a coiled tubing operation. In one implementation, a method includes forming a tubing string, the tubing string having an outer surface. The method also includes applying a coating to an application portion of the outer surface of the tubing string. The application portion includes a portion of the tubing string that will be disposed in a horizontal section of a wellbore, and the coating has a surface energy lower than a surface energy of the outer surface of the tubing string to thereby reduce friction between the tubing string and a casing disposed in the horizontal section of the wellbore as the tubing string is lowered into the wellbore.

16 Claims, 10 Drawing Sheets

(56) References Cited

U.S. PATENT DOCUMENTS

| | | | |
|---|---|---|---|
| 8,052,173 B2 * | 11/2011 | Carcagno ........... C10M 169/044 285/94 |
| 8,258,206 B2 | 9/2012 | Kanagasabapathy et al. |
| 8,602,113 B2 | 12/2013 | Jin et al. |
| 9,528,327 B1 | 12/2016 | Lux |
| 9,541,224 B2 | 1/2017 | Rowland et al. |
| 10,364,931 B1 | 7/2019 | Arumugam et al. |
| 2004/0237890 A1 * | 12/2004 | Bour ....................... F16L 58/10 118/715 |
| 2010/0044110 A1 | 2/2010 | Bangru et al. |
| 2010/0206553 A1 | 8/2010 | Bailey et al. |
| 2011/0024103 A1 | 2/2011 | Storm, Jr. et al. |
| 2011/0220415 A1 * | 9/2011 | Jin .......................... E21B 41/00 175/57 |
| 2011/0272139 A1 * | 11/2011 | Van Den Brekel .......................... E21B 17/1007 175/320 |
| 2012/0000643 A1 | 1/2012 | Bruun et al. |
| 2014/0021244 A1 | 1/2014 | DuBois |
| 2014/0287161 A1 | 9/2014 | Ertas et al. |
| 2018/0200770 A1 | 7/2018 | Rowland |

OTHER PUBLICATIONS

International Search Report and Written Opinion dated May 7, 2020 for Application No. PCT/US2020/017946.

International Search and Written Opinion dated Apr. 4, 2018, corresponding to Application No. PCT/US2018/013988.

Lauer, Robert S., "The Use of High Performance Polymeric Coatings To Mitigate Corrosion and Deposit Formation in Pipeline Applications", 2007, pp. 1-8.

Lauer, Robert S., "Advancements in the Abrasion Resistance of Internal Plastic Coatings", Materials Performance, Jan. 2014, pp. 52-55.

Afghoul, Ali Chareuf et al., "Coiled Tubing: The Next Generation", Oilfield Review, 2004, pp. 38-57.

A Breakthrough Pipeline Surface Treatment, Oceanlt, pp. 1-2 (available as of Jun. 2019).

Corrosion Prevention and Control Worldwide, Materials Performance, Jan. 2018, pp. 1-80, vol. 57 No. 1.

Ali, Naser et al., "A Review on Nanofluids: Fabrication, Stability, and Thermophysical Properties", Journal of Nanomaterials, Jun. 4, 2018, pp. 1-33.

Oceanit, "Flow Through Hydrophobic & Hydrophilic Pipes", YouTube, Sep. 18, 2017, https://www.youtube.com/watch?v=sPoTJOGCKHU (last accessed Jan. 23, 2020).

Oceanit, "Hydrophilic and Hydrophobic Treatment Demo | Oceanit Surface Treatments", YouTube, Dec. 12, 2017, https://www.youtube.com/watch?v=sbuTk8hpnkc (last accessed Jan. 23, 2020).

Oceanit, "DragX | Pipeline Surface Treatment | Oceanit Surface Treatments", YouTube, Feb. 16, 2018, https://www.youtube.com/watch?v=qMZPDY1WI8Q (last accessed Jan. 23, 2020).

Oceanit, "Hydrophobic Roll-Off Angle Test | Oceanit Surface Treatments", YouTube, Feb. 27, 2018, https://www.youtube.com/watch?v=PKsqFAXVqzc (last accessed Jan. 23, 2020).

Oceanit, "Omniphobic Wetting Behavior | Oceanit Surface Treatments", YouTube, Mar. 1, 2018, https://www.youtube.com/watch?v=td50EevSgRs (last accessed Jan. 23, 2020).

Non-Final Office Action dated Oct. 6, 2020 for U.S. Appl. No. 16/720,342.

* cited by examiner

METHOD OF CONDUCTING A COILED TUBING OPERATION

BACKGROUND

Field

The disclosure relates to a method of conducting a coiled tubing operation.

Description of the Related Art

Coiled tubing strings are used in many applications in the oil and gas industry. One particular application is for the recovery of oil and gas through a wellbore having a horizontal portion (also referred to as "a horizontal well") that extends through a hydrocarbon bearing reservoir. However, several problems can arise when a coiled tubing string is inserted into a horizontal well.

For example, high friction forces might cause buckling, sinusoidal lockup, helical lockup, or a reduced lifespan of the coiled tubing string as it is lowered into the horizontal well, which may limit the horizontal reach of the coiled tubing string because these problems tend to worsen as the horizontal portion of the well lengthens. Also, the tortuosity of the well, or the sloping of the horizontal portion of the well in an upward or a downward direction, can also complicate calculations of the potential horizontal reach of the coiled tubing string.

Therefore, there is a need for a new and/or improved coiled tubing operation.

SUMMARY

Implementations of the present disclosure relate to methods of conducting a coiled tubing operation.

In one implementation, a method includes forming a tubing string, the tubing string having an outer surface. The method also includes applying a coating to an application portion of the outer surface of the tubing string. The application portion includes a portion of the tubing string that will be disposed in a horizontal section of a wellbore, and the coating has a surface energy lower than a surface energy of the outer surface of the tubing string to thereby reduce friction between the tubing string and a casing disposed in the horizontal section of the wellbore as the tubing string is lowered into the wellbore.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
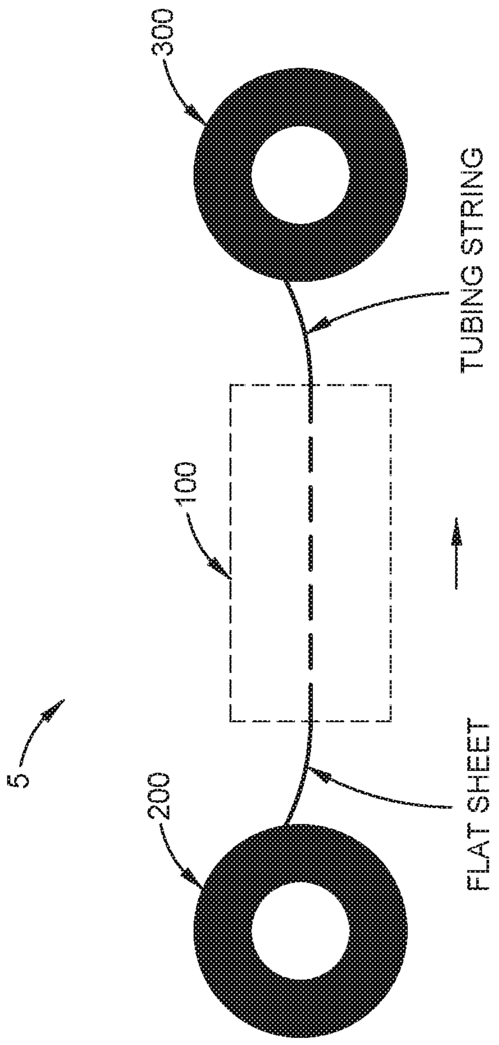
FIG. 1 is a schematic illustration of a coiled tubing string forming process, according to one embodiment.

FIG. 1 is a schematic illustration of a coiled tubing string forming process 5, according to one embodiment. The coiled tubing string forming process 5 includes uncoiling a flat sheet of metal from an accumulator 200, feeding the flat sheet through a method 100 of manufacturing a coiled tubing string, and coiling the formed tubing string onto a spool 300, all in a single continuous operation to meet specified material properties. Although additional testing, inspection, and installation may occur after the tubing string is spooled onto the spool 300, the tubing string will be manufactured to meet specified material properties upon being coiled onto the spool 300.

The specified material properties may include, but are not limited to, physical properties, mechanical properties, and structural properties. The physical properties may include, but are not limited to, dimensions (such as length, inner/outer diameter size, and wall thickness), surface quality (such as smoothness), and roundness. The mechanical properties may include but are not limited to, yield strength, tensile strength, elongation, elastic modulus, toughness, fracture toughness, hardness, fatigue life, fatigue strength, ductility. The structural properties may include, but are not limited to grain size, corrosion resistance, microstructure, and composition.

Figure 2:
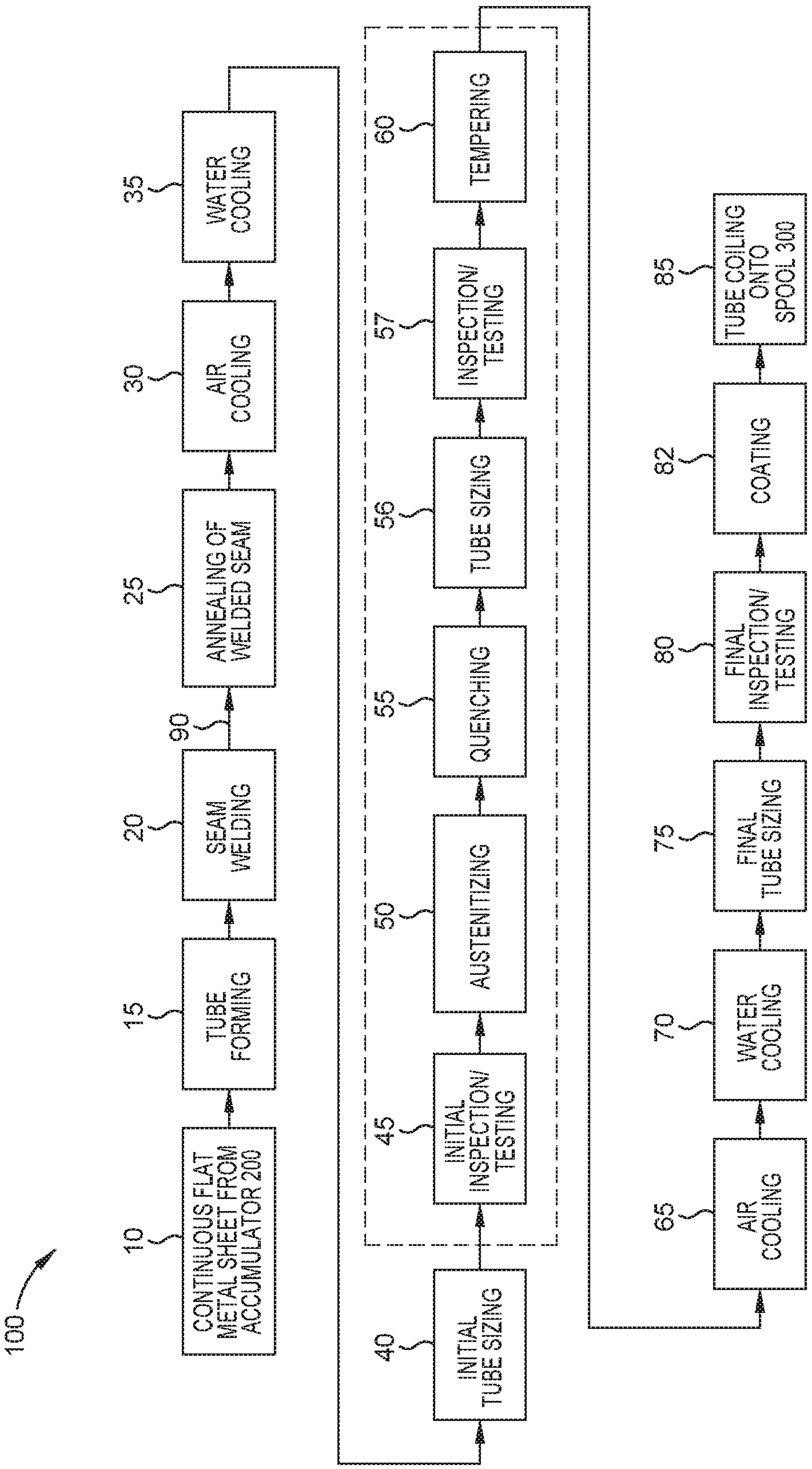
FIG. 2 is a schematic illustration of a method of manufacturing a coiled tubing string, according to one embodiment.

FIG. 2 schematically illustrates the method 100 of manufacturing a coiled tubing string in a continuous operation, beginning with a continuous flat metal sheet 10 and ending with a tubing string coiled onto a spool 300 (shown in FIG. 1). The flat metal sheet 10 may be pre-coiled onto the accumulator 200. The flat metal sheet 10 may comprise wrought iron or steel.

The flat metal sheet 10 is continuously fed from the accumulator 200 into the tube forming operation 15. In the tube forming operation 15, the flat metal sheet 10 is bent into a tubular form such that a longitudinal seam is formed along the longitudinal length by the edges of the flat metal sheet 10 that are brought together. The flat metal sheet 10 may be bent into the tubular form using one or more tube formers as known in the art.

From the tube forming operation 15, the flat metal sheet 10 is continuously fed into a seam welding operation 20. In the seam welding operation 20, the flat metal sheet 10 that has been bent into a tubular form is welded along the seam to form a tubing string 90. The seam may be welded using a high frequency induction welding process and/or other welding processes as known in the art.

After the seam welding operation 20, the tubing string 90 is sent through a seam annealing operation 25, an air cooling operation 30, and/or a water cooling operation 35, collectively referred to as an initial cooling operation. In particular, the tubing string 90 is annealed along the seam weld, then air cooled, and/or then water cooled to a temperature less than about 200 degrees Fahrenheit.

In the seam annealing operation 25, for example, the welded seam is quickly heated (such as by induction heating to a temperature of about 955 degrees Celsius) to reduce hardness, refine grain size, and increase ductility of the welded seam. In the air cooling operation 30 and/or the water cooling operation 35, for example, the tubing string 90 is slowly cooled entirely or at least partially by air and/or water to bring down the temperature of the tubing string 90 to a temperature less than about 200 degrees Fahrenheit for initial tube sizing and/or inspection/testing operations. The initial cooling operation may include any number of air cooling and/or water cooling operations.

After the initial cooling operation, an initial tube sizing operation 40 is conducted. The tubing string 90 progresses through the initial tube sizing operation 40 where one or more sizing rollers form the preliminary outside diameter of the tubing string 90. For example, the one or more rollers (incrementally) reduce the outer diameter of the tubing string 90 from a larger outer diameter to a smaller nominal outer diameter. After the initial tube sizing operation 40, the tubing string 90 undergoes an optional initial inspection/testing operation 45 where one or more non-destructive tests are conducted on the tubing string 90 to verify that the specified material properties and weld seam quality of the tubing string 90 have been attained.

From the optional initial inspection/testing operation 45, the tubing string 90 is sent through an austenitizing operation 50, a quenching operation 55, and/or a tempering operation 60, collectively referred to as a heat treatment operation. In particular, the tubing string 90 is treated, e.g. repeatedly heated and/or cooled, by the heat treatment operation to attain specified material properties, such as by changing the microstructure of the tubing string 90. The austenizing operation 50, quenching operation 55, and the tempering operation 60 may be optional.

In the austenitizing operation 50, for example, the tubing string 90 is heated to a temperature within a range of about 850 degrees Celsius to about 1,050 degrees Celsius to change the microstructure of the tubing string 90 to austenite. In the quenching operation 55, for example, the tubing string 90 is rapidly cooled by water to form martensite and increase the hardness and strength of the tubing string 90. In the tempering operation 60, for example, the tubing string 90 is heated again to decrease some of the hardness of the tubing string 90 attained during the quenching operation 55 and form a tempered martensite microstructure. The heat treatment operation may include any number of stress relieving operations such as austenitizing, quenching, and/or tempering operations. From the quenching operation 55, the tubing string 90 is continuously fed into an optional tube sizing operation 56 to conduct tube sizing. In the tube sizing operation 56, the outer diameter of the tubing string 90 can be refined to a desired outer diameter. After the optional tube sizing operation 56, the tubing string 90 undergoes an optional inspection/testing operation 57 where one or more non-destructive tests can be conducted on the tubing string 90 to verify that the specified material properties and weld seam quality of the tubing string 90 have been attained.

After the heat treatment operations, the tubing string 90 is sent through another air cooling operation 65 and/or another water cooling operation 70, collectively referred to as a final cooling operation. In particular, the tubing string 90 is air cooled and then water cooled to a temperature less than about 200 degrees Fahrenheit. In the air cooling operation 65 and/or the water cooling operation 70, for example, the tubing string 90 is slowly cooled by air and/or water to bring down the temperature of the tubing string 90 for final tube sizing, inspection/testing, and/or coiling operations. The final cooling operation may include any number of air cooling and/or water cooling operations.

From the final cooling operation, the tubing string 90 is continuously fed into a final tube sizing operation 75 to conduct final tube sizing. In the final tube sizing operation 75, the outer diameter of the tubing string 90 is refined to a desired outer diameter. For example, the outer diameter of the tubing string 90 may be reduced (in one or more stages by one or more series of sizing rollers) during the final tube sizing operation 75. The tubing string 90 may be sized to have a substantially uniform outer diameter, a substantially uniform inner diameter, and/or a substantially uniform wall thickness. After the final tube sizing operation 75, the tubing string 90 undergoes a final inspection/testing operation 80 where one or more non-destructive tests are conducted on the tubing string 90 to verify that the specified material properties and weld seam quality of the tubing string 90 have been attained.

From the final inspection/testing operation 80, the tubing string 90 may proceed to a coating operation 82, the embodiments of which are described in more detail below. The coating operation 82 may result in reduced friction forces whenever the tubing string 90 is implemented in a wellbore for coiled tubing operations. For example, the coating operation 82 may reduce the friction between the tubing string 90 and any casing that is disposed downhole in an oil and gas wellbore. The coating operation 82 is more reliable at reducing friction than other efforts that can result in the following problems: a damaged tubing string 90; a weak tubing string 90; a limited horizontal reach of tubing string 90; a limited length of tubing string 90 that may be transported on a spool; operational inconsistencies; and/or undesirably high operational costs for the oil and gas operations. The coating operation 82 also provides corrosion resistance for the tubing string 90, whereas other manufacturing processes do not.

From the final inspection/testing operation 80, or the coating operation 82 (if applicable), the tubing string 90 is continuously fed into a tube coiling operation 85. In the tube coiling operation 85, the tubing string 90 is continuously coiled onto a spool, such as the spool 300 illustrated in FIG. 1. The tubing string 90 has met all specified material properties and weld seam quality upon being coiled onto the spool 300.

The method 100 is not limited to the sequence or number of operations illustrated in FIG. 2, but may include other embodiments that include re-ordering, repeating, adding, and/or removing one or more of the operations 10, 15, 20, 25, 30, 35, 40, 45, 50, 55, 60, 65, 70, 75, 80, 82, and/or 85.

The specified material properties of the tubing string 90 formed by the method 100 may be substantially uniform across substantially the entire length of the tubing string 90 but may vary within normal tolerance ranges. The tubing string 90 may be formed of any type of metallic material, such as steel.

In one or more embodiments, a tubing string having a length within a range of about 10,000 feet to about 30,000 feet may be formed using the method 100 described herein. In one or more embodiments, a tubing string having an outer diameter of up to about 5.5 inches may be formed using the method 100 described herein. In one or more embodiments, a tubing string having an inner diameter within a range of about 1 inch to about 5 inches may be formed using the method 100 described herein. In one or more embodiments, a tubing string having at least one of an outer diameter and an inner diameter of up to about 5.5 inches may be formed using the method 100 described herein.

In one or more embodiments, a tubing string having a yield strength within a range of about 80,000 psi to about 190,000 psi may be formed using the method 100 described herein. In one or more embodiments, a tubing string having a tensile strength within a range of about 90,000 psi to about 190,000 psi may be formed using the method 100 described herein. In one or more embodiments, a tubing string having a hardness within a range of about 18 Rockwell HRC to about 45 Rockwell HRC may be formed using the method 100 described herein.

Figure 3:
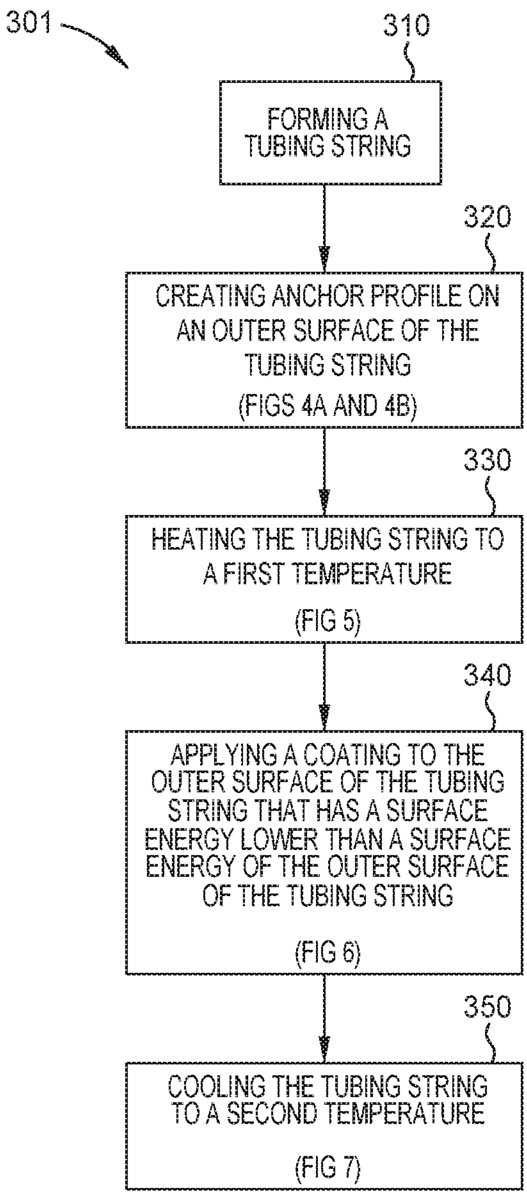
FIG. 3 is a schematic illustration of a method of coating a coiled tubing string, according to one embodiment.

FIG. 3 illustrates a coating method 301 for coating a coiled tubing string. One or more steps of the coating method 301 may be performed in the coating operation 82 illustrated in FIG. 2. At step 310, a tubing string is formed, with the tubing string having an outer surface. At step 320, an anchor profile is created on the outer surface of the tubing string. The anchor profile may include any type of surface treatment, such as blasting with an abrasive material, configured to help a coating adhere to the outer surface of the tubing string.

At step 330, the tubing string optionally may be heated to a first temperature prior to applying a coating to the outer surface of the tubing string. At step 340, a coating is applied to the outer surface of the tubing string. The coating has a surface energy that is lower than a surface energy of the outer surface of the tubing string. At step 350, the tubing string may optionally be cooled to a second temperature after the coating is applied to the outer surface of the tubing string. The coating method 301 is not limited to the sequence or number of steps illustrated in FIG. 3, but may include other embodiments that include re-ordering, repeating, adding, and/or removing one or more of the steps 310, 320, 330, 340, and/or 350.

Figure 4A:
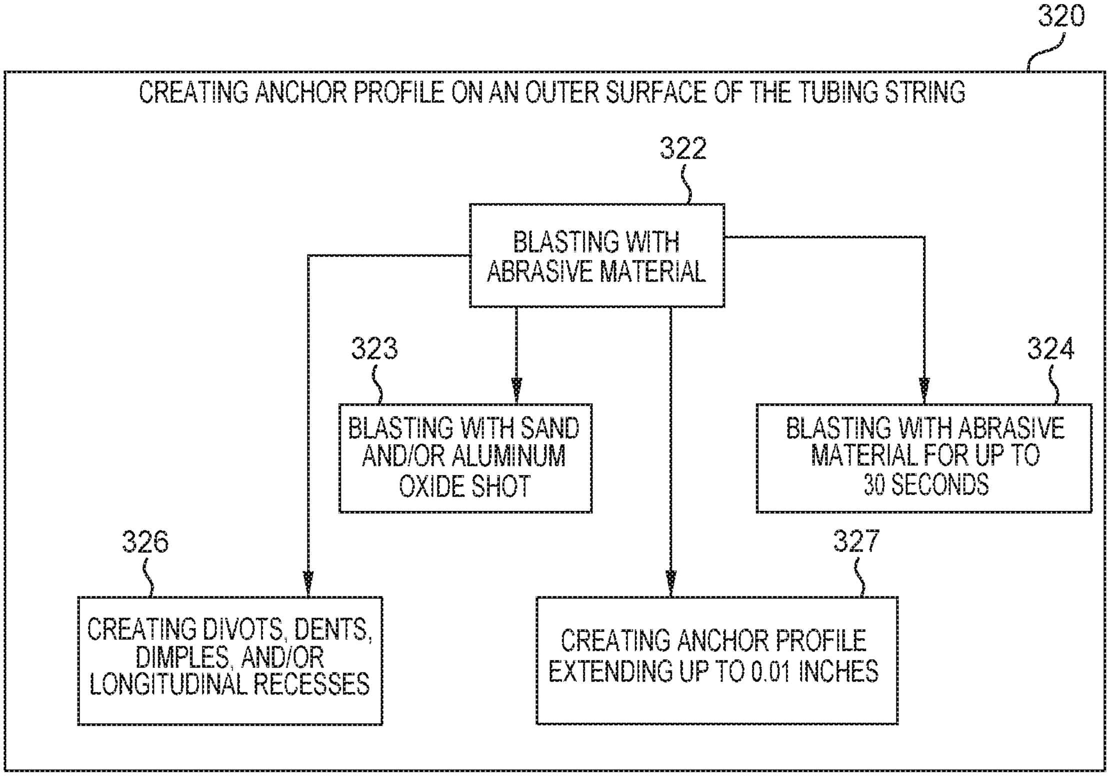
FIGS. 4A and 4B are schematic illustrations of a portion of the method of coating a coiled tubing string, according to several embodiments.

FIG. 4A illustrates several embodiments of step 320 of the coating method 301. At step 320, an anchor profile is created on the outer surface of the tubing string to help the coating adhere to the outer surface of the tubing. The anchor profile may be created by blasting the outer surface of the tubing string with an abrasive material at step 322. Blasting the outer surface of the tubing string may be performed with a wheelabrator or other blasting equipment. In one or more embodiments, the outer surface of the tubing string is blasted with an abrasive material that includes sand, steel shot, ceramics, and/or an aluminum oxide shot at step 323. The outer surface of the tubing string can be blasted with any abrasive material that would create an anchor profile on the outer surface. In one or more embodiments, the outer surface of the tubing string is blasted with an abrasive material for up to 30 seconds at step 324.

Blasting the outer surface of the tubing string with an abrasive material creates an anchor profile that extends into the outer surface of the tubing string. The anchor profile may extend to a depth that is up to about 0.010 inches at step 327. In one or more embodiments, the anchor profile includes one or more divots, one or more longitudinal recesses (e.g., scratches), one or more dents, and/or one or more dimples that are created on the outer surface of the tubing string at step 326. The divots, dents, dimples, and/or longitudinal recesses may be regularly shaped, irregularly shaped, non-linear, linear, circular, rectangular, square, and/or may be arcuate in shape.

Figure 4B:
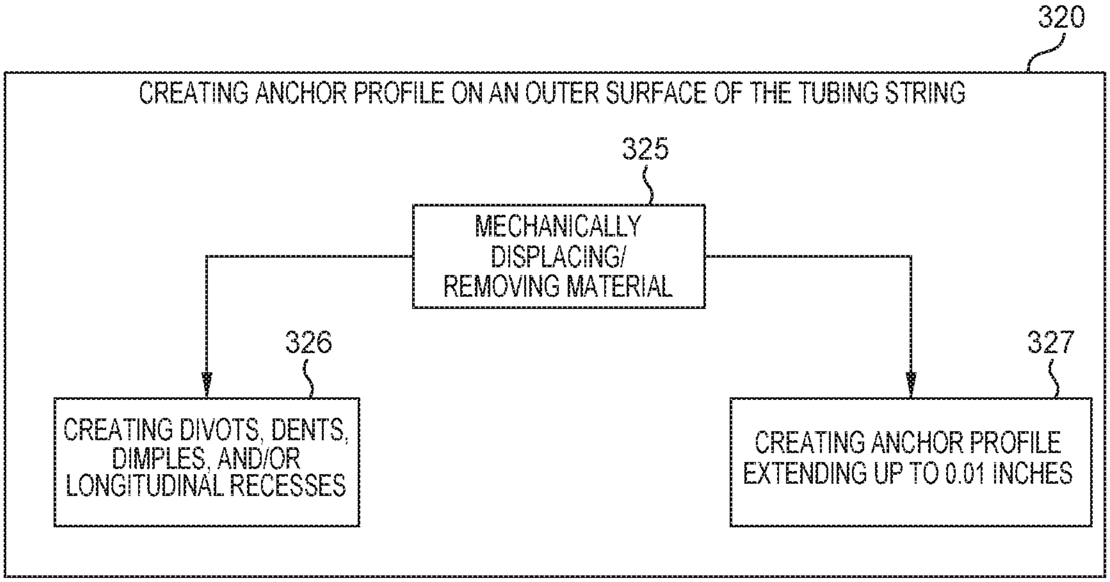

FIG. 4B illustrates several embodiments of step 320 of the coating method 301. At step 320, an anchor profile is created on the outer surface of the tubing string. The anchor profile may be created by mechanically displacing and/or mechanically removing material on the outer surface of the tubing string at step 325. This may be achieved with machinery that is known in the art, such as presses, gouging machines, wheelabrators, hollow blasts, circle blasts, rotating blasts, hollow cone heads, nozzles, and/or air pumps. The anchor profile may extend into the outer surface of the tubing string to a depth that is up to about 0.010 inches at step 327. In one or more embodiments, the anchor profile includes one or more divots, one or more longitudinal recesses (e.g., scratches), one or more dents, and/or one or more dimples that are created on the outer surface of the tubing string at step 326. The divots, dents, dimples, and/or longitudinal recesses may be regularly shaped, irregularly shaped, non-linear, linear, circular, rectangular, square, and/or may be arcuate in shape.

The embodiments illustrated in step 320 are not limited to the sequence or number of steps illustrated in FIG. 4A or 4B, but may include other embodiments that include re-ordering, repeating, adding, and/or removing one or more of the steps 322, 323, 324, 325, 326, and/or 327.

Figure 5:
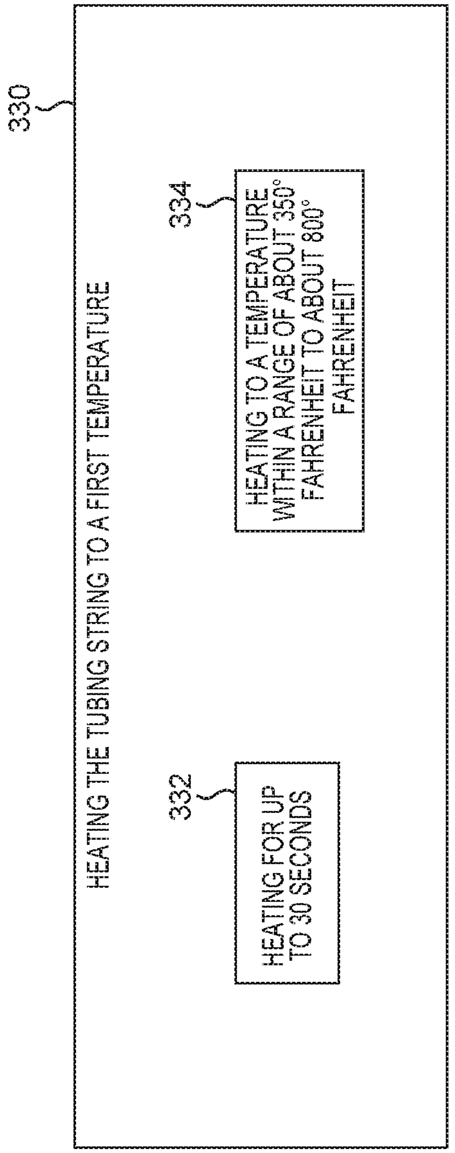
FIG. 5 is a schematic illustration of a portion of the method of coating a coiled tubing string, according to several embodiments.

FIG. 5 illustrates several embodiments of optional step 330 (e.g. heating the tubing string) of the coating method 301. At step 332, the heating of the tubing string lasts for up to 30 seconds. At step 334, the tubing string may be heated to a first temperature that is within a range of about 350 degrees Fahrenheit to about 800 degrees Fahrenheit. The embodiments illustrated in step 330 are not limited to the sequence or number of steps illustrated in FIG. 5, but may include other bodiments that include re-ordering, repeating, adding, and/or removing one or more of the steps 332 and/or 334.

Figure 6:
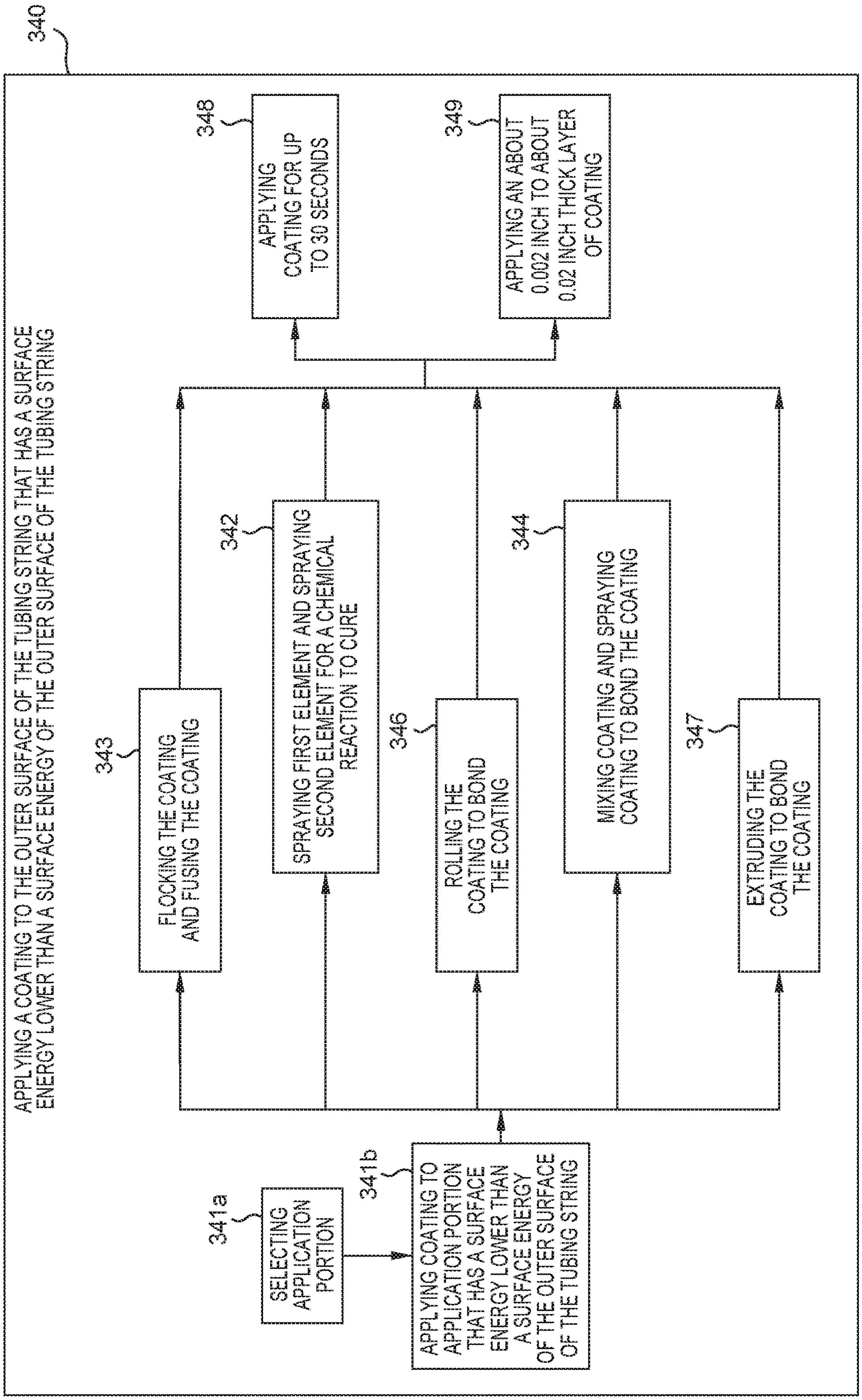
FIG. 6 is a schematic illustration of a portion of the method of coating a coiled tubing string, according to several embodiments.

FIG. 6 illustrates several embodiments of step 340 of the coating method 301. At step 340, a coating is applied to the outer surface of the tubing string that has a surface energy lower than a surface energy of the outer surface of the tubing string, which tubing string may be formed out of carbon steel, such as low alloyed carbon steel. The coating can affect the tribology of a system that involves the tubing string. For example, the lower surface energy of the coating can reduce the friction between the tubing string and a casing in a wellbore when the tubing string is disposed in the wellbore during a coiled tubing operation.

Specifically, at step 341*a*, an application portion is selected on the outer surface of the tubing string, and at step 341*b*, a coating is applied to the application portion that has a surface energy lower than a surface energy of the outer surface of the tubing string. The coating may be applied according to various methods or processes, including but not limited to spraying, painting, flocking, rolling, extruding, and/or depositing the coating. In one example, the coating covers at least a part of the outer surface that is within the application portion. In one example, the coating covers substantially an entirety of the outer surface of the tubing string that is disposed within the application portion. As discussed below with respect to FIG. 9, the application portion selected at step 341*a* may include a first application section corresponding to a portion of the tubing string that will be disposed at least in part horizontally in a wellbore during a coiled tubing operation; a second application section corresponding to a portion of the tubing string that will be disposed at least in part vertically in the wellbore during the coiled tubing operation; and a third application section corresponding to a portion of the tubing string that will be at least in part curved while disposed in the wellbore during the coiled tubing operation. The application portion may span the total longitudinal length of the tubing string, or it may span part of the total longitudinal length of the tubing string.

The coating may include any suitable material that has a surface energy lower than a surface energy of the outer surface of the tubing string to help reduce friction in a wellbore system. In one embodiment, the coating includes a powder coating. The coating can also include a liquid coating. In one example, the coating includes one or more of a fusion bonded epoxy, a polytetrafluoroethylene material, a high density polypropylene, a high density polyethylene, an abrasion resistant overlay (ARO) material, and/or any other suitable polymeric material. As shown at step 348, the coating may be applied to the outer surface of the tubing string for up to 30 seconds. As shown at step 349, the coating is applied to the outer surface of the tubing string such that the layer of coating has a thickness within a range of about 0.002 inches to about 0.02 inches. For example, the coating may have a thickness within a range of about 0.004 inches to about 0.006 inches.

In one or more embodiments, the coating is flocked onto the outer surface of the tubing string at step 343, and an electrostatic charge fuses the coating to the outer surface of the tubing string to form the coating. Flocking can include spraying the coating or using any other process of depositing the coating onto the outer surface of the tubing string. In one or more embodiments, the electrostatic charge is applied to the tubing string. In one or more embodiments, the electrostatic charge is an inherent property of the coating. For example, the electrostatic charge may be an inherent property of the coating when the coating is applied to a carbon steel. In one or more embodiments, the coating includes a powder coating. The coating may be applied with tools known in the art, such as spray nozzles and flocking equipment. Additionally, an electrostatic charge may be applied with known devices, such as electrodes. As shown at step 348, step 343 may be performed such that the coating is applied to the outer surface of the tubing string for up to 30 seconds. As shown at step 349, step 343 may be performed such that a layer of coating is applied to the outer surface of the tubing string, and the layer of coating has a thickness within a range of about 0.002 inches to about 0.02 inches. For example, the coating has a thickness within a range of about 0.004 inches to about 0.006 inches.

In one or more embodiments, a first element is sprayed on the outer surface of the tubing string at step 342, and a second element is sprayed on the outer surface of the tubing string such that the second element creates a chemical reaction with the first element, thereby curing the first element to the outer surface of the tubing string and forming a coating. As shown at step 348, step 342 may be performed such that the coating is applied to the outer surface of the tubing string for up to 30 seconds. As shown at step 349, step 342 may be performed such that a layer of coating is applied to the outer surface of the tubing string, and the layer of coating has a thickness within a range of about 0.002 inches to about 0.02 inches. For example, the coating has a thickness within a range of about 0.004 inches to about 0.006 inches.

In one or more embodiments, the coating is rolled onto the outer surface of the tubing string at step 346, such that the coating bonds to the outer surface of the tubing string. The coating may be rolled with machines known in the art, such as rollers. As shown at step 348, step 346 may be performed such that the coating is applied to the outer surface of the tubing string for up to 30 seconds. As shown at step 349, step 346 may be performed such that a layer of coating is applied to the outer surface of the tubing string, and the layer of coating has a thickness within a range of about 0.002 inches to about 0.02 inches. For example, the coating has a thickness within a range of about 0.004 inches to about 0.006 inches.

In one or more embodiments, two or more materials are mixed together to form the coating at step 344, and the coating is sprayed onto the outer surface of the tubing string such that the coating bonds to the outer surface of the tubing string. As shown at step 348, step 344 may be performed such that the coating is sprayed to the outer surface of the tubing string for up to 30 seconds. As shown at step 349, step 344 may be performed such that a layer of coating is applied to the outer surface of the tubing string, and the layer of coating has a thickness within a range of about 0.002 inches to about 0.02 inches. For example, the coating has a thickness within a range of about 0.004 inches to about 0.006 inches.

In one or more embodiments, the coating is extruded onto the outer surface of the tubing string at step 347, such that the coating bonds to the outer surface of the tubing string. The coating may be extruded with machines known in the art, such as extruders. As shown at step 348, step 347 may be performed such that the coating is applied to the outer surface of the tubing string for up to 30 seconds. As shown at step 349, step 347 may be performed such that a layer of coating is applied to the outer surface of the tubing string, and the layer of coating has a thickness within a range of about 0.002 inches to about 0.02 inches. For example, the coating has a thickness within a range of about 0.004 inches to about 0.006 inches.

The embodiments illustrated in step 340 are not limited to the sequence or number of steps illustrated in FIG. 6, but may include other embodiments that include re-ordering, repeating, adding, and/or removing one or more of the steps 340, 341*a*, 341*b*, 342, 343, 344, 346, 347, 348 and/or 349.

Figure 7:
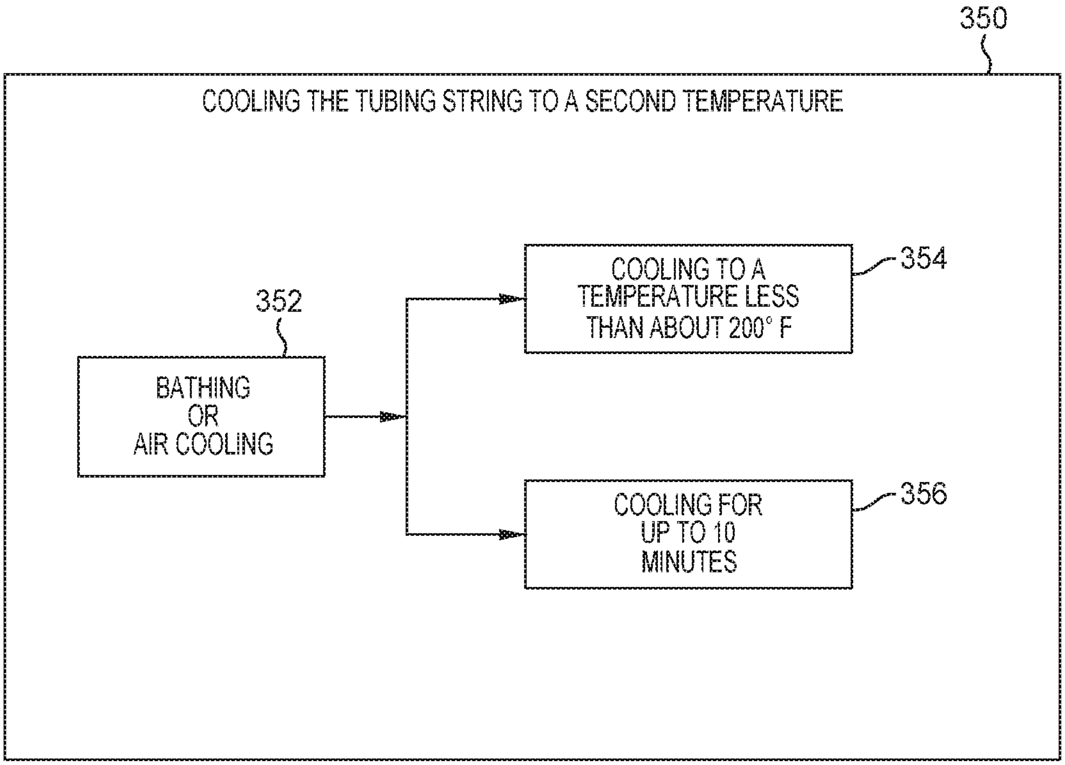
FIG. 7 is a schematic illustration of a portion of the method of coating a coiled tubing string, according to several embodiments.

FIG. 7 illustrates several embodiments of optional step 350 (e.g. cooling the tubing string) of the coating method 301. At step 352, cooling is performed by bathing the tubing string with water or other suitable fluid, or air cooling the tubing string. At step 354, the tubing string may be cooled to a temperature less than about 200 degrees Fahrenheit. At step 356, the tubing string may be cooled for a time period of up to 10 minutes. The embodiments illustrated in step 350 are not limited to the sequence or number of steps illustrated in FIG. 7, but may include other embodiments that include re-ordering, repeating, adding, and/or removing one or more of the steps 352, 354, and/or 356.

Figure 8:
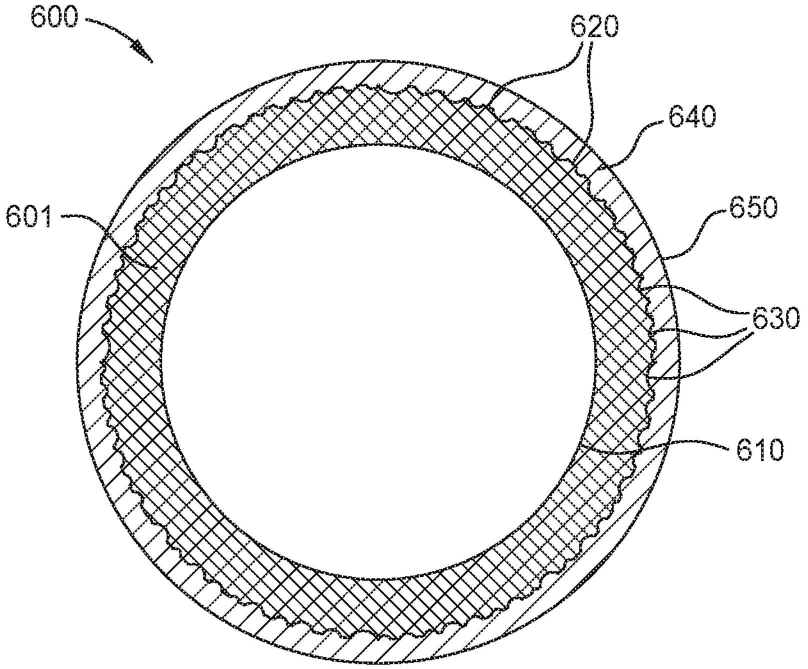
FIG. 8 is a cross-sectional illustration of a coiled tubing string, according to one embodiment.
Figure 9:
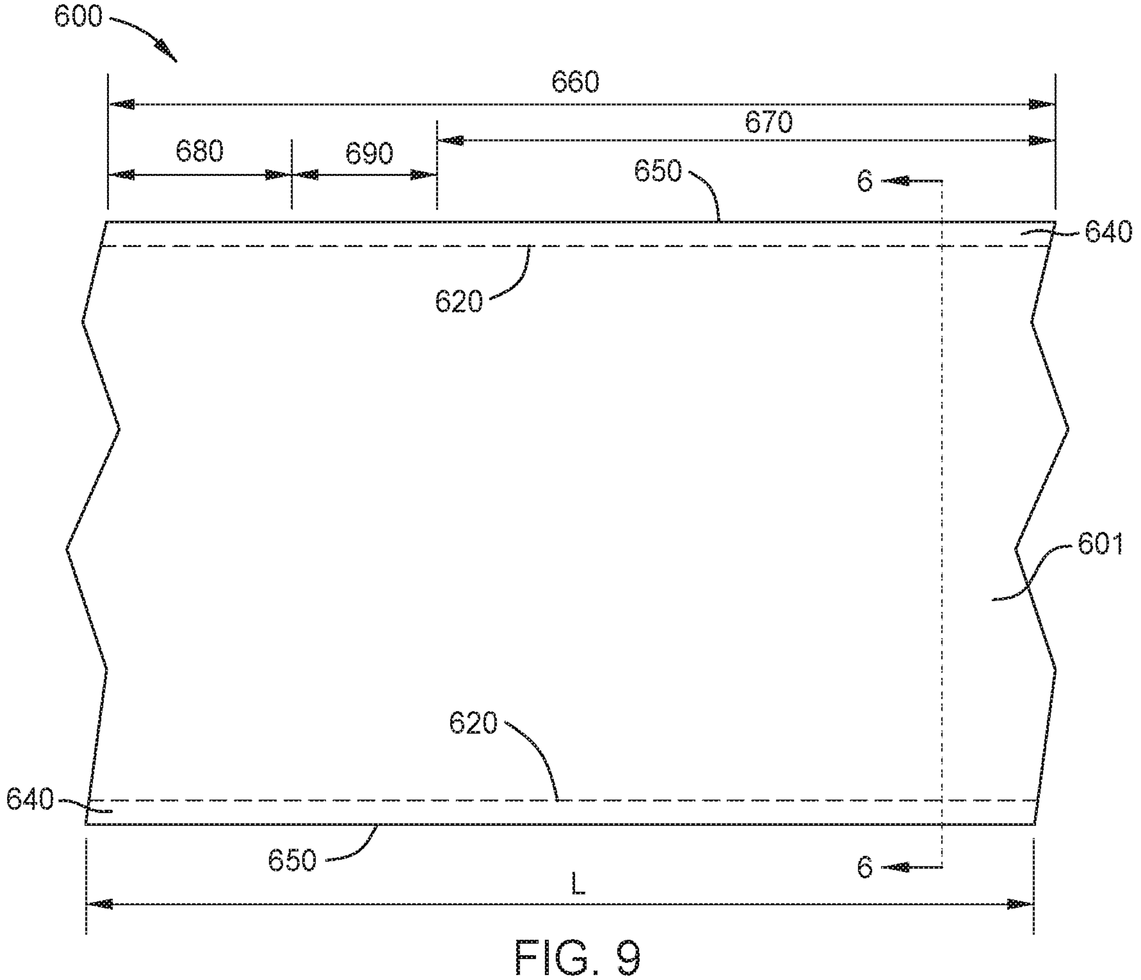
FIG. 9 is a side-view illustration of a section of the coiled tubing string, according to one embodiment.

FIG. 8 illustrates a cross-sectional view of a coiled tubing string 600, according to one embodiment, with the cut for the cross-sectional view being taken along section 6-6 illustrated in FIG. 9. The coiled tubing string 600 includes a tubing string 601 that has an inner surface 610 and an outer surface 620. The tubing string 601 includes an anchor profile 630 disposed on the outer surface 620 of the tubing string 601, and a coating 640 applied as a layer on the outer surface 620 of the tubing string 601. The anchor profile 630 may be formed using one or more of the methods described herein, and the coating 640 may be applied using one or more of the methods described herein.

As illustrated in FIG. 8, the coating 640 may fill in the anchor profile 630 on the outer surface 620 of the tubing string 601. Also, the coating 640 may be applied to cover substantially an entirety of the outer surface 620 (e.g. the entire circumference) of the tubing string 601. The coating 640 as shown defines an outer surface 650 of the coating 640. The coating 640 may be bonded, fused, or cured to the outer surface 620 of the tubing string 601. The coating 640 may also be made up of a powder coating that can be flocked or extruded onto the tubing string.

FIG. 9 illustrates a side view of a portion of the coiled tubing string 600, according to one embodiment. Although the tubing string 601 is depicted in a linear fashion in FIG. 9, it may also be curved. For example, the tubing string 601 could be curved when coiled onto a spool.

In the embodiment shown, the coating 640 is applied to the outer surface 620 of the tubing string 601 that is within an application portion 660. The coating 640 is applied to cover substantially an entirety of the outer surface 620 of the tubing string 601 that is disposed within the application portion 660. The application portion 660 may include a first application section 670, a second application section 680, and a third application section 690. The first application section 670 may correspond to a portion of the tubing string 601 that will be disposed at least in part horizontally in a wellbore during a coiled tubing operation. The second application section 680 may correspond to a portion of the tubing string 601 that will be disposed at least in part vertically in the wellbore during the coiled tubing operation. The third application section 690 may correspond to a portion of the tubing string 601 that will be at least in part curved while disposed in the wellbore during the coiled tubing operation. The application portion 660, the first application section 670, the second application section 680, and the third application section 690 are disposed along an axial length L of the tubing string 601.

Figure 10:
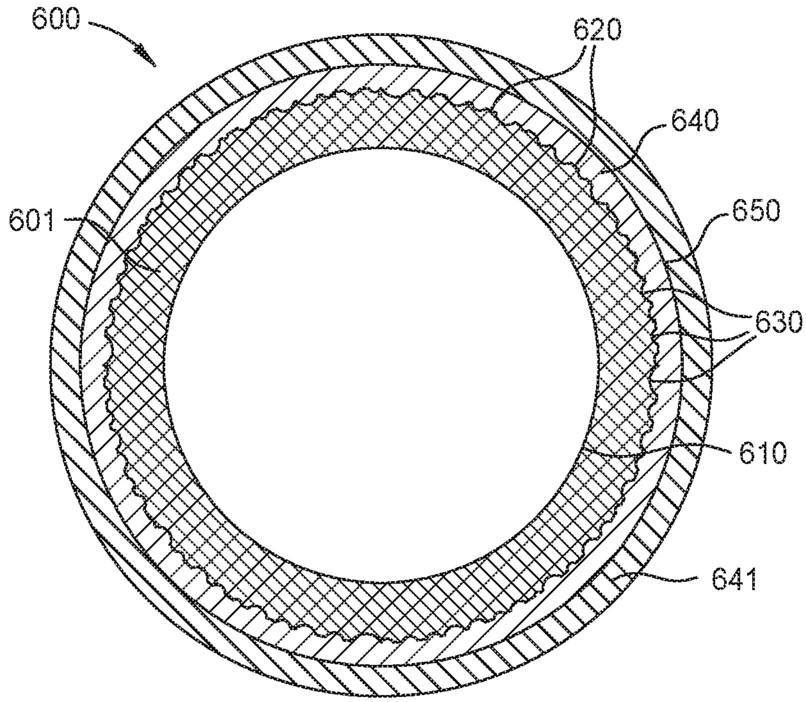
FIG. 10 is a cross-sectional illustration of a coiled tubing string, according to one embodiment.

FIG. 10 illustrates a cross-sectional view of a coiled tubing string 600. The coiled tubing string 600 is similar to the coiled tubing string 600 illustrated in FIG. 8. The coiled tubing string 600 includes a second coating layer 641 disposed on the coating 640. The second coating layer 641 can include one or more of the same aspects and/or materials of the coating 640. The second coating layer 641 is a protective layer. In one or more embodiments, the second coating layer 641 includes a UV protection material, a hardening element, and/or an abrasion overlay.

Figure 11:
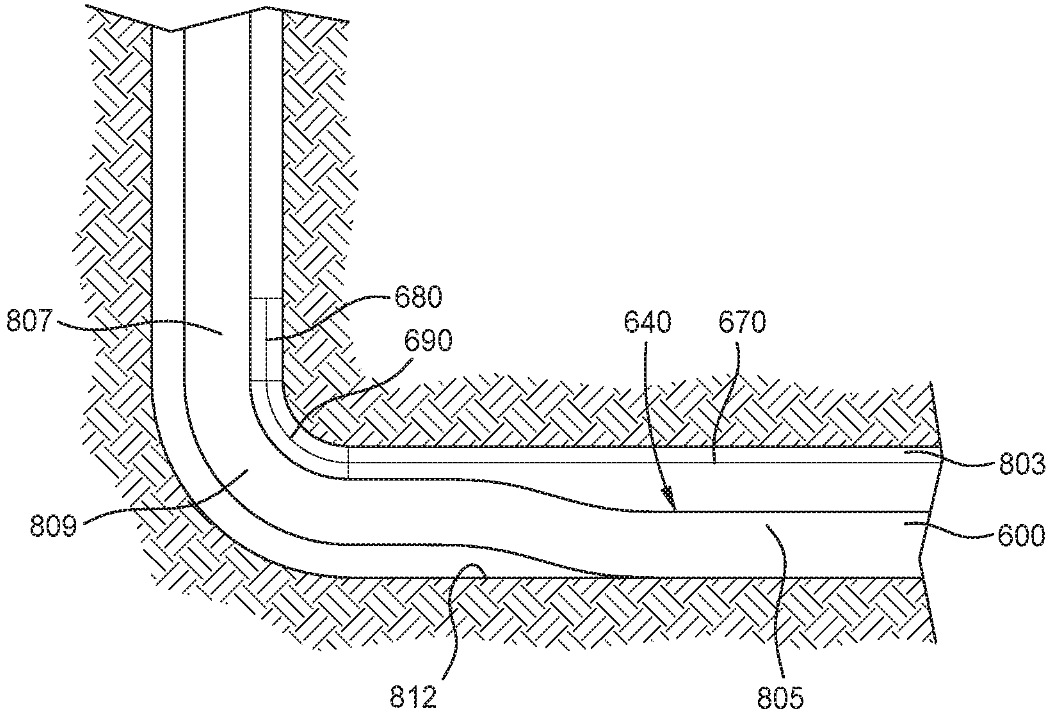
FIG. 11 is an illustration of a section of a coiled tubing string disposed in a wellbore during coiled tubing operations, according to one embodiment.

FIG. 11 illustrates a portion of the coiled tubing string 600 disposed in a wellbore 803 having a casing 812 during a coiled tubing operation. The coiled tubing string 600 includes a horizontal portion 805 that is disposed horizontally in a horizontal section of the wellbore 803. The coiled tubing string 600 also includes a vertical portion 807 that is disposed vertically in a vertical section of the wellbore 803. The coiled tubing string 600 also includes a curved portion 809 that is disposed in a curved section of the wellbore 803. The wellbore 803 shown in FIG. 11 is only one schematic example of a wellbore trajectory, and one of ordinary skill in the art would recognize that the wellbore can include various other trajectories including vertical, curved, and/or horizontal sections having various increasing and/or decreasing inclination angles (e.g. sloping upward and/or downward), as well as various increasing and/or decreasing azimuthal angles (e.g. turning left or right). In addition to the wellbore 803, the horizontal portion 805 and the vertical portion 807 of the coiled tubing string 600 may not be perfectly horizontal or vertical, respectively, when lowered into the wellbore 803. For example, the horizontal portion 805 may include portions that slope upwards or downwards at various points, and the vertical portion 807 may slope forward or backward at various points. As another example, the horizontal portion 805 and/or the vertical portion 807 of the coiled tubing string 600 may include one or more portions having one or more vertical waves and/or one or more horizontal waves.

The portion of the coiled tubing string 600 shown in FIG. 11 includes the first application section 670 that corresponds to the horizontal portion 805, the second application section 680 that corresponds to the vertical portion 807, and the third application section 690 that corresponds to the curved portion 809. The embodiments of the coating 640 as discussed above may be applied on the first application section 670 only; on the first and second application sections 670 and 680 only; or on the first, second, and third application sections 670, 680, and 690. The horizontal portion 805 of the coiled tubing string 600 contacts the casing 812 disposed in the wellbore 803. The coating 640 on any of the portions of the coiled tubing string 600, such as on the horizontal portion 805, reduces friction between the coiled tubing string 600 and the casing 812, which reduces or eliminates the risk of buckling and/or sinusoidal lockup, and reduces the amount of force required to lower the coiled tubing string 600 into the wellbore 803.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements.

We claim:

1. A method of conducting a coiled tubing operation, comprising:

forming a coiled tubing string, the coiled tubing string having an outer surface and being formed from a metallic material;

selecting an application portion of the coiled tubing string that corresponds to a horizontal section of a wellbore and a vertical section of the wellbore once the coiled tubing string is positioned in a fully deployed state within the wellbore, wherein the application portion does not include axial length of the coiled tubing string corresponding in the fully deployed state to a curved section of the wellbore disposed between the horizontal and vertical sections;

applying a coating to the outer surface of the coiled tubing string only along the application portion, wherein the coating has a surface energy lower than a surface energy of the outer surface of the coiled tubing string to thereby reduce friction between the tubing coiled string and a casing disposed in the horizontal section of the wellbore as the coiled tubing string is lowered into the wellbore, wherein the coating has a thickness within a range of 0.002 inches to 0.02 inches after application; and lowering the coiled tubing string into the wellbore to the fully deployed state such that the coating covers an entirety of the outer surface of the coiled tubing string in the horizontal section of the wellbore and all of the coiled tubing string in the vertical section of the wellbore, but the coiled tubing string in the curved section of the wellbore does not have the coating.

2. The method of claim 1, further comprising creating an anchor profile on the outer surface of the coiled tubing string that is within the application portion and applying the coating to the anchor profile to help adhere the coating to the coiled tubing string.

3. The method of claim 2, wherein creating the anchor profile comprises blasting the outer surface of the coiled tubing string with an abrasive material to create the anchor profile.

4. The method of claim 2, wherein creating the anchor profile comprises mechanically displacing material on the outer surface of the coiled tubing string to create the anchor profile.

5. The method of claim 1, wherein applying the coating comprises:

spraying a first element on the outer surface of the tubing string; and spraying a second element on the outer surface of the tubing string such that the second element creates a chemical reaction with the first element, thereby curing the first element to the outer surface of the tubing string.

6. The method of claim 1, wherein applying the coating comprises rolling the coating onto the outer surface of the tubing string such that the coating bonds to the outer surface of the tubing string.

7. The method of claim 1, wherein applying the coating comprises:

mixing two or more materials to form the coating; and spraying the coating on the outer surface of the tubing string such that the coating bonds to the outer surface of the tubing string.

8. The method of claim 1, wherein applying the coating comprises extruding the coating onto the outer surface of the tubing string such that the coating bonds to the outer surface of the tubing string.

9. The method of claim 1, wherein applying the coating is performed for a time period of up to 30 seconds.

10. The method of claim 1, further comprising:

heating the coiled tubing string to a first temperature within a range of 350 degrees Fahrenheit to 800 degrees Fahrenheit prior to applying the coating; and cooling the coiled tubing string to a second temperature within a range of 40 degrees Fahrenheit to 140 degrees Fahrenheit after applying the coating.

11. The method of claim 10, wherein heating the coiled tubing string to the first temperature is performed for a time period of up to 30 seconds.

12. The method of claim 10, wherein cooling the coiled tubing string to the second temperature is performed for a time period of up to 10 minutes.

13. The method of claim 1, further comprising applying a second coating on top of the coating.

14. The method of claim 1, wherein the coating includes a polymeric material.

15. A method of conducting a coiled tubing operation, comprising:

providing a coiled tubing string, the coiled tubing string having an outer surface and being formed from a metallic material;

selecting an application portion of the coiled tubing string that corresponds to a horizontal section of a particular wellbore and a vertical section of the particular wellbore once the coiled tubing string is positioned in a fully deployed state within the particular wellbore, wherein the application portion does not include axial length of the coiled tubing string corresponding in the fully deployed state to a curved section of the particular wellbore disposed between the horizontal and vertical sections;

applying a coating to the outer surface of the coiled tubing string only along the application portion of the coiled tubing string, wherein the coating has a surface energy lower than a surface energy of the outer surface of the coiled tubing string to thereby reduce friction between the coiled tubing string and a casing disposed in the horizontal section of the particular wellbore; and lowering the coiled tubing string into the particular wellbore to the fully deployed state such that the coating covers an entirety of the outer surface of the coiled tubing string in the horizontal section of the particular wellbore and all of the coiled tubing string in the vertical section of the particular wellbore, but the coiled tubing string in the curved section of the particular wellbore does not have the coating.

16. The method of claim 15, wherein the coating comprises polytetrafluroethylene.

* * * * *